US009092646B2

(12) United States Patent
Grab et al.

(10) Patent No.: US 9,092,646 B2
(45) Date of Patent: *Jul. 28, 2015

(54) SYSTEMS AND METHODS FOR IDENTIFYING CONSUMER ELECTRONIC PRODUCTS BASED ON A PRODUCT IDENTIFIER

(75) Inventors: Eric William Grab, San Diego, CA (US); Kourosh Soroushian, San Diego, CA (US); Tung Lin, San Diego, CA (US); Francis Yee-Dug Chan, San Diego, CA (US); Evan Wallin, San Diego, CA (US)

(73) Assignee: Sonic IP, Inc., San Diego, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 13/436,898

(22) Filed: Mar. 31, 2012

(65) Prior Publication Data
US 2013/0007443 A1    Jan. 3, 2013

Related U.S. Application Data

(60) Provisional application No. 61/581,598, filed on Dec. 29, 2011, provisional application No. 61/503,581, filed on Jun. 30, 2011.

(51) Int. Cl.
G06F 21/00    (2013.01)
G06F 21/73    (2013.01)
G06F 21/10    (2013.01)
(Continued)

(52) U.S. Cl.
CPC ............... *G06F 21/73* (2013.01); *G06F 21/10* (2013.01); *G06F 21/33* (2013.01); *G06F 21/604* (2013.01)

(58) Field of Classification Search
CPC ............................. G06F 21/33; G06F 21/604
USPC .................... 713/168, 188, 162, 155; 726/26; 705/57; 380/201
See application file for complete search history.

(56) References Cited

U.S. PATENT DOCUMENTS 5,734,823 A    3/1998  Chang et al.
6,834,269 B1   12/2004  Bueche et al.
(Continued)

OTHER PUBLICATIONS

International Search Report and Written Opinion for International Application No. PCT/US2012/44680, International Filing Date Jun. 28, 2012, Search Completed Aug. 29, 2012, Mailed Sep. 18, 2012, 12 pgs.

(Continued)

*Primary Examiner* — Harunur Rashid
*Assistant Examiner* — Angela Holmes
(74) *Attorney, Agent, or Firm* — KPPB LLP

(57) ABSTRACT

Systems and methods for identifying consumer electronic products using a playback device with a product identifier in accordance with embodiments of the invention are disclosed. One embodiment includes a processor, and memory configured to store a product identifier, where the product identifier is associated with a specific product and is associated with cryptographic information, and user account data, where the user account data is associated with a user account. In addition, the processor is configured by an application to receive a request for registration from a playback device, receive a product identifier from the playback device, retrieve cryptographic information using the playback device, and send user account data to the playback device encrypted using at least the cryptographic information associated with the product identifier.

35 Claims, 8 Drawing Sheets

(51) Int. Cl.
    *G06F 21/60*     (2013.01)
    *G06F 21/33*     (2013.01)

(56) References Cited

U.S. PATENT DOCUMENTS

| | | |
|---|---|---|
| 2002/0150243 A1 | 10/2002 | Craft et al. |
| 2003/0118974 A1 | 6/2003 | Obrador |
| 2004/0117306 A1 | 6/2004 | Karaoguz et al. |
| 2004/0268152 A1 | 12/2004 | Xia et al. |
| 2006/0015580 A1 | 1/2006 | Gabriel et al. |
| 2007/0064936 A1 | 3/2007 | Kasahara et al. |
| 2007/0198414 A1 | 8/2007 | Derrenberger |
| 2009/0235070 A1 | 9/2009 | Trench |

OTHER PUBLICATIONS

International Preliminary Report on Patentability for International Application No. PCT/US2012/044680, International Filing Date Jun. 28, 2012, Mailed Apr. 1, 2014, 11 pgs.

FIG. 2A

| Tag Canonical | Tag Alias |
|---|---|
| PT1 | Product ID Version |
| PT2 | Brand |
| PT3 | ODM/Manufacturer |
| PT4 | Device Type |
| PT5 | Model Number |
| PT6 | Base Model Number |
| PT7 | Silicon Platform ID |
| PT8 | Certified Playback Profile |
| PT9 | Country |
| PT10 | DSAS Software Version |

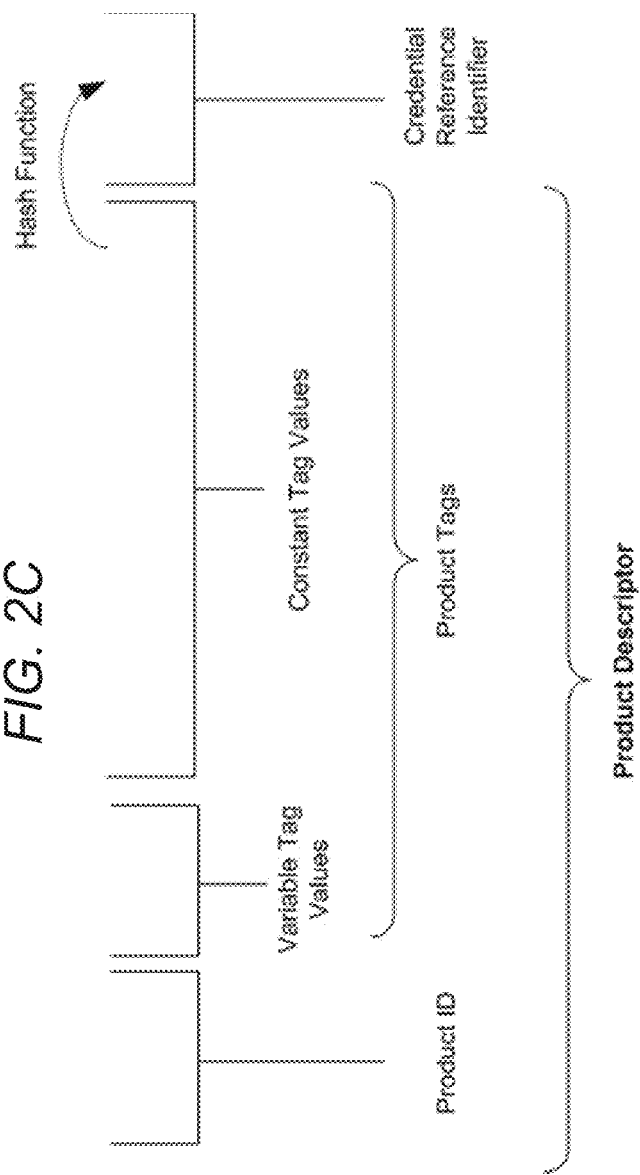

US 9,092,646 B2

SYSTEMS AND METHODS FOR IDENTIFYING CONSUMER ELECTRONIC PRODUCTS BASED ON A PRODUCT IDENTIFIER

CROSS-REFERENCE TO RELATED APPLICATIONS

The current application claims priority to U.S. Provisional Application No. 61/503,581, filed Jun. 30, 2011, the disclosure of which is incorporated herein by reference in its entirety. The current application also claims priority to U.S. Provisional Application No. 61/581,598, filed Dec. 29, 2011, the disclosure of which is incorporated herein by reference in its entirety.

FIELD OF THE INVENTION

The present invention relates generally to managing consumer electronics products operating on a digital rights management (DRM) system, and more specifically to systems and methods for reliably identifying a class of device by product line using an identifier.

BACKGROUND OF THE INVENTION

A consumer electronic or CE device is typically built using a specific chipset designed for a specific class of consumer electronics device (e.g. high definition televisions). Many original equipment manufacturers (OEMs) can utilize the same chipset to produce a similar product. The OEMs differentiate the products using different firmware to modify the user interface and the capabilities of the device. In many instances, products manufactured by an OEM that share a common chipset and firmware are referred to as a product line.

A common capability of CE devices is the playback of multimedia content. A variety of digital rights management (DRM) systems exist to prevent unauthorized playback of protected content. DRM systems typically encrypt content so that a specific cryptographic key or combination of cryptographic keys is required to play back the content. Playback devices typically register with the DRM system to obtain the keys that are necessary to play back protected content.

A DRM system owner/operator may implement a certification system, through which it "approves" a device model or product line to operate on its DRM system. Certification typically involves the DRM system operator testing that the device and/or chipset and firmware combination that defines a product line operates in the manner required for operation within the DRM system. Once a device model or product line is approved to operate within a DRM system, purchasers of approved devices can register the devices with the DRM system and play protected content authorized for playback on the registered device.

SUMMARY OF THE INVENTION

Systems and methods for identifying consumer electronic products using a playback device with a product identifier in accordance with embodiments of the invention are disclosed. One embodiment includes a processor, and memory configured to store a product identifier, where the product identifier is associated with a specific product and is associated with cryptographic information, and user account data, where the user account data is associated with a user account. In addition, the processor is configured by an application to receive a request for registration from a playback device, receive a product identifier from the playback device, retrieve cryptographic information using the playback device, and send user account data to the playback device encrypted using at least the cryptographic information associated with the product identifier.

In a further embodiment, the user account data includes a user identifier and cryptographic information associated with the user identifier.

In another embodiment, the cryptographic information associated with the user identifier includes a user key and product SSL certificate.

In a still further embodiment, the processor is further configured by an application to encrypt content using cryptographic information including the cryptographic information associated with the user identifier.

In still another embodiment, the processor is further configured by an application to authenticate a session with the playback device using at least the product SSL certificate.

In a yet further embodiment, the cryptographic information associated with the product identifier includes a product key.

In yet another embodiment, the cryptographic information associated with a user identifier is encrypted using a product key.

In a further embodiment again, the cryptographic information associated with a user identifier is encrypted using a product key and a device key that is associated with the class of device to which the playback device belongs.

In another embodiment again, the processor is further configured by an application to determine the revocation status of the product identifier.

In a further additional embodiment, the memory is further configured to store a revocation list of revoked product identifiers.

In another embodiment again, the processor is further configured by an application to maintain and update the revocation list by adding or removing revoked product identifiers.

In a still yet further embodiment, the processor is further configured by an application to communicate with a remote system that maintains product identifier revocation status.

In still yet another embodiment, the memory is further configured to store product tag data associated with the product identifier, and wherein product tag data comprises at least one product tag that describes a characteristic of the product.

In a still further embodiment again, product tag data includes at least one tag selected from the group of: product ID version, brand, ODM/manufacturer, device type, model number, base model number, silicon platform ID, certified playback profile, country, and digital secure adaptive streaming software version.

In still another embodiment again, the memory is further configured to store a product credential reference identifier that is associated with the product identifier and is uniquely generated using at least a portion of the product tag data.

In a still further additional embodiment, the method used to generate the product credential reference identifier corresponds to a product identifier version.

In still another additional embodiment, the processor is further configured by an application to send a request for product tags to a playback device, receive at least one product tag from the playback device, generate a first product credential reference identifier from at least one of the received product tags, and determine whether the first product credential reference identifier matches a second product credential reference identifier.

In a yet further additional embodiment, the processor is further configured by an application to retrieve the second product credential reference identifier from the memory.

In yet another additional embodiment, the processor is further configured by an application to receive the second product credential reference identifier from the playback device.

Another further embodiment includes a processor, and a database of playback capabilities indexed by product identifier. In addition, the processor is configured by an application to receive a product identifier from a playback device, retrieve the playback capabilities for the playback device from the database using the product identifier, generate a top level index file indexing a plurality of alternative streams of content, where the plurality of alternative streams of content are selected from a set of alternative streams of content based upon the playback capabilities of the playback device, and provide the top level index file to the playback device.

In yet another further embodiment, the processor is configured by an application receive a product descriptor from a playback device, where the product descriptor includes the product identifier, at least one constant product tag and at least one variable product tag, and the database of playback capabilities is indexed by product identifier, constant product tag, and variable product tag.

In still another further embodiment, the processor is configured by the application to retrieve the playback capabilities for the playback device by configuring the processor to query the database based upon the product descriptor received from the playback device. In addition, the processor is configured to query the database based upon the combination of the product identifier and the at least one constant product tag received from the playback device, when no match is found based on the product descriptor. Furthermore, the processor is configured to query the database based upon the product identifier received from the playback device, when no match is found based on the combination of the product identifier and the at least one constant product tag.

An embodiment of the method of the invention includes receiving a request for registration from a playback device, receiving a product identifier from a playback device, where the product identifier is associated with a specific product and is associated with cryptographic information, retrieving cryptographic information from memory that is associated with the received product identifier, and sending user account data to the playback device encrypted using at least the cryptographic information associated with the product identifier, where the user account data is associated with a user account.

In a further embodiment of the method of the invention, the user account data includes a user identifier and cryptographic information associated with the user identifier.

In another embodiment of the method of the invention, the cryptographic information associated with the user identifier includes a user key.

In a still further embodiment of the method of the invention, the cryptographic information associated with the product identifier includes a product key.

In a yet further embodiment of the method of the invention, the cryptographic information associated with a user identifier is encrypted using a product key.

In yet another embodiment of the method of the invention, the cryptographic information associated with a user identifier is encrypted using a product key and a device key that is associated with the class of device to which the playback device belongs.

A further embodiment again of the method of the invention also includes determining the revocation status of the product identifier.

Another embodiment again of the method of the invention also includes communicating with a remote system that maintains product identifier revocation status.

A further additional embodiment of the method of the invention also includes associating product tag data with the product identifier, where the product tag data comprises at least one product tag that describes a characteristic of the product, and storing the product tag data in memory.

In another additional embodiment of the method of the invention product tag data comprises at least one tag selected from the group of: product ID version, brand, ODM/manufacturer, device type, model number, base model number, silicon platform ID, certified playback profile, country, and digital secure adaptive streaming software version.

A still yet further embodiment of the method of the invention also includes associating a product credential reference identifier that is uniquely generated using at least the product identifier and at least a portion of the product tag data, and storing the product credential reference identifier in memory.

In still yet another embodiment of the method of the invention, the method used to generate the product credential reference identifier corresponds to a product identifier version.

A still further embodiment again of the method of the invention also includes sending a request for product tags from a playback device, receiving at least one product tag from the playback device, generating a first product credential reference identifier from at least one of the received product tags, and determining whether the first product credential reference identifier matches a second product credential reference identifier.

Still another embodiment again of the method of the invention also includes receiving the second product credential reference identifier from the playback device.

A still further additional embodiment of the method of the invention also includes retrieving the second product credential reference identifier from memory.

Another further embodiment of the method of the invention includes receiving a product identifier from a playback device using a registration server, retrieving the playback capabilities for the playback device from a database of playback capabilities indexed by product identifier using the registration server, generating a top level index file indexing a plurality of alternative streams of content using the registration server, where the plurality of alternative streams of content are selected from a set of alternative streams of content based upon the playback capabilities of the playback device, and providing the top level index file to the playback device using the registration server.

In still another further embodiment of the method of the invention, receiving a product identifier from a playback device using a registration server further includes receiving a product descriptor from a playback device, where the product descriptor includes the product identifier, at least one constant product tag and at least one variable product tag. In addition, the database of playback capabilities is indexed by product identifier, constant product tag, and variable product tag.

In yet another further embodiment of the method of the invention, retrieving the playback capabilities for the playback device from a database of playback capabilities indexed by product identifier using the registration server further includes querying the database based upon the product descriptor received from the playback device using the registration server, querying the database based upon the combination of the product identifier and the at least one constant product tag received from the playback device using the registration server, when no match is found based on the product descriptor, and querying the database based upon the product identifier received from the playback device using the registration server, when no match is found based on the combination of the product identifier and the at least one constant product tag.

BRIEF DESCRIPTION OF THE DRAWINGS

FIG. 2A is a chart listing product tags in accordance with an embodiment of the invention.

FIG. 2B conceptually illustrates product tags forming a set of product tag data.

FIG. 2C conceptually illustrates the relationship between a product descriptor, a product ID, product tags (both constant and variable), and a credential reference identifier in accordance with an embodiment of the invention.

DETAILED DESCRIPTION

Figure 1:
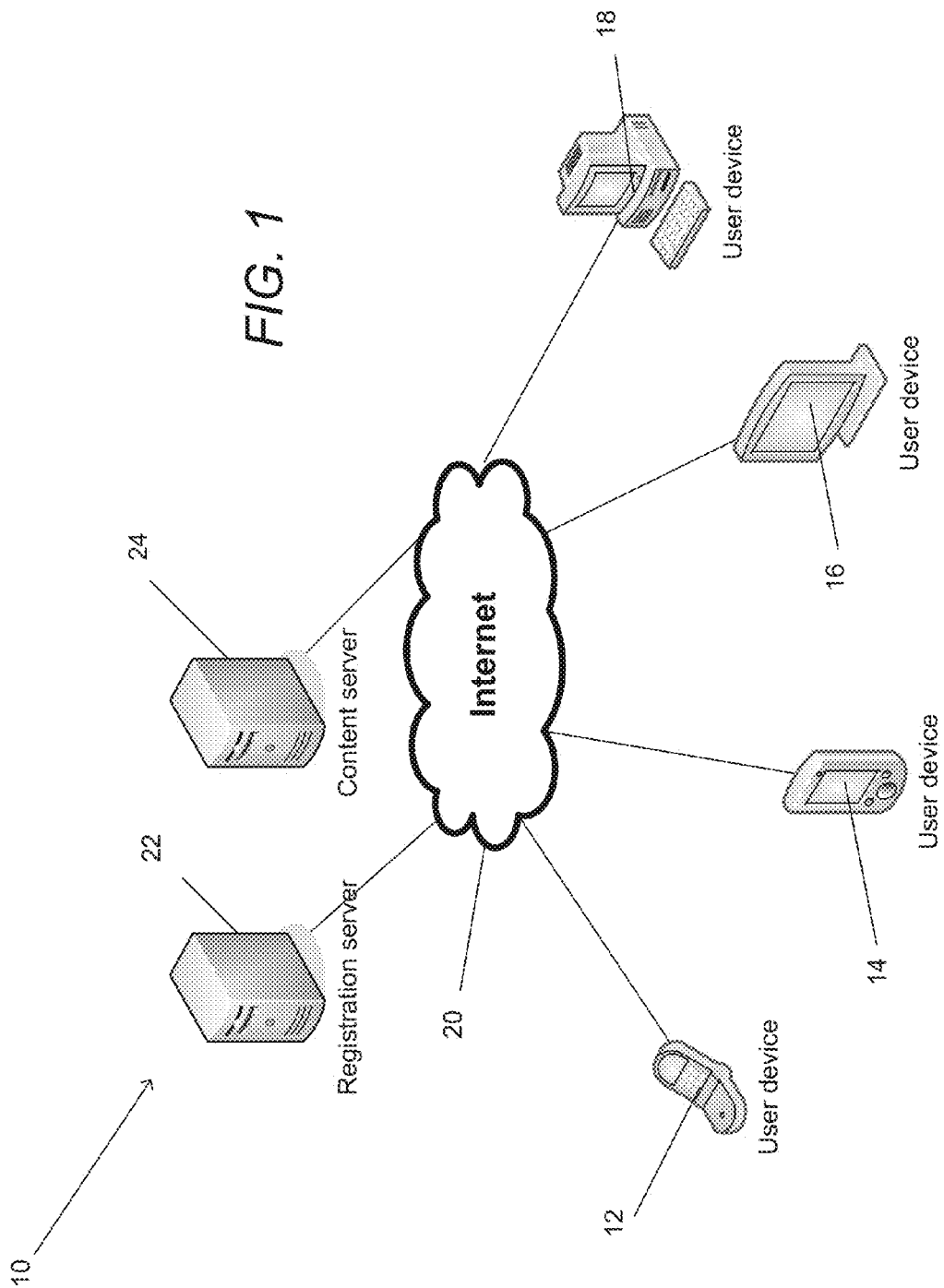
FIG. 1 is a system-level overview illustrating a DRM and content distribution system in accordance with an embodiment of the invention.

Turning now to the drawings, systems and methods for identifying consumer electronic products using a playback device with a product descriptor are illustrated. In many embodiments of the invention, playback devices operate within a digital rights management (DRM) system in which they communicate with different types of servers over a network. In many embodiments, the playback devices are certified for use in the DRM system. Certification is an endorsement by a DRM system operator that devices in a particular product line have been tested to be compatible with the DRM system. It may be tempting for a device manufacturer to resort to a form of counterfeiting, by taking firmware that was written for the chipset of one model of device and placing it on another model of device that uses the same chipset. This improper use of the issued device certification can present technical difficulties in interoperability with the DRM system and is typically motivated by a desire to avoid paying royalties and/or other contractual obligations related to the use of the DRM system with respect to the devices in question.

DRM systems in accordance with many embodiments of the invention utilize a mechanism to identify products by manufacturer and product line in order to enforce certification policies, facilitate confinement of security breaches, and assist with the tracking of revenues. In a number of embodiments, a process for certifying a product and/or product line within a DRM system can include assigning a product descriptor to each product or product line. The term product can be used to refer to both individual products and product lines and is used to refer to both products and product lines throughout the discussion that follows.

In order to facilitate reviewing whether the product ID installed on a specific device is appropriate to the device (i.e. whether the device is the product indicated by the product ID), DRM systems in accordance with a number of embodiments of the invention also store product tag data describing the product on the device and a product credential reference identifier (credential reference ID) generated using some or all of the product tag data. Displaying the product tag data enables a quick visual inspection of whether the characteristics of the device correspond to the product characteristics indicated by the product tags. The product credential reference ID is generated using a subset of the product tags that remain constant through the useful life of the product (constant tags) and can be utilized to verify that the product tag data corresponds to the characteristics of the device. If the product credential reference ID generated using some or all of the product tags does not match the stored product credential reference ID associated with a specific product ID, then tampering is likely present.

In many embodiments, a product ID together with constant product tags and a subset of the product tags that may change over the life of the product (variable product tags) form a product descriptor. Variable product tags can be used to indicate software versions or provide tracking capabilities. The product descriptor can serve to differentiate devices within a product line (i.e., having the same product ID) by their installed software version and/or updates the device has received.

In several embodiments, one or more pieces of cryptographic data (product keys) can also be issued with respect to each product ID and/or product descriptor. The product key(s) can be utilized to issue technically protected content to the device. In the event of a security breach with respect to a specific product, the product key(s) can be revoked to limit the scope of the security breach. DRM systems and methods for identifying different products within a DRM system in accordance with embodiments of the invention are discussed further below.

System Architecture

A DRM system in accordance with an embodiment of the invention is illustrated in FIG. 1. The DRM system 10 includes a plurality of consumer electronics devices that include information identifying a specific product or product line to which the device belongs. In the illustrated embodiment, the consumer electronics devices include devices with content playback capabilities such as (but not limited to) a cellular phone 12, smart phone 14, television 16, personal computer 18, DVD player, or digital media player. The consumer electronics devices are configured to communicate with remote servers via a network 20 such as the Internet. In the illustrated embodiment, the DRM system includes a registration server 22 and content server 24. Devices typically first connect to a registration server to be associated with a user account and acquire credentials/cryptographic data (e.g., SSL certificate, encryption keys) used to access content. Devices may then connect to a content server and request content with the credentials. The content server can issue the requested content in such a way that the credentials/cryptographic data (e.g., SSL certificate, encryption keys) of the device are required to access the content.

A variety of techniques can be utilized to identify a specific product. In a number of embodiments, a product descriptor that includes a product ID is assigned to each product. The product ID can be generated based upon the characteristics of the product and/or arbitrarily assigned. Variations within a product can be identified by a product descriptor that includes a product ID, variable product tags, and constant product tags. One or more variable product tags can be used to indicate a variation such as different software versions and updates. The product descriptor and/or product ID can be utilized in a variety of processes including (but not limited to) the certification and registration of the device. In several embodiments, the use of the product ID during certification is enhanced by also associating product tag data with the product ID to form a product descriptor. The product tag data describes the product and, when displayed, can be utilized to readily verify whether the characteristics of the device correspond to the characteristics of the product associated with the product ID. In many embodiments, attempts to detect tampering with the product tags can be identified by generating a product credential reference ID using some or all of the product tags. The product credential reference ID can be stored with respect to the product tags originally associated with a product ID. When a product credential reference ID generated using the product tags present on a device do not match with the stored product credential reference ID associated with the product ID, tampering is present. In several embodiments, cryptographic data is also associated with the product ID to enable the quarantining of security breaches with respect to a specific product.

In many embodiments, the product ID, product credential reference ID, product key, and product tag data are stored in non-volatile memory on a playback device. Often, when a playback device is designed and manufactured to be used in a DRM system, the DRM system operator will package into a dataload the encryption keys, algorithms, and/or other information and software instructions necessary for the device to communicate with DRM servers and receive content. In several embodiments of the invention, the product ID and other data is included in the dataload given to a manufacturer for storage on each device.

Although a specific architecture is shown in FIG. 1 any of a variety of architectures can be utilized that enable playback devices to communicate with servers over a network in accordance with embodiments of the invention. Furthermore, much of the discussion that follows relates to the use of the product descriptor, product ID, product credential reference ID, product key(s) and product tag data in the certification of products and authentication of devices. As can readily be appreciated not all of the product credential reference ID, product key(s) and product tag data need be associated with a product ID. Indeed, additional data associated with a product ID can vary depending upon the requirements of a specific application in accordance with embodiments of the invention. Product descriptors, Product IDs, additional data that can be associated with product IDs, and systems and methods for using product IDs and associated data in accordance with embodiments of the invention are discussed further below.

Product Identifier

In many embodiments of the invention, a product identifier (ID) is a character string that is associated with one or more sets of product tag data, where a set of product tag data is descriptive of a product. Any of a number of methods can be used to generate a product ID, including a random number generator, manual numbering or determination by a person, or systematic methods such as using sequential numbers or globally unique identifiers.

Product Tag Data

In several embodiments of the invention, a set of product tag data is associated with a product ID. The individual tags represent information about some aspect of a product. In several embodiments of the invention, an original equipment manufacturer (OEM) requests that a product be certified (i.e. issued a product ID) and provides information for the product tags. The DRM system operator certifies the product by verifying that a device that is exemplary of the product passes certain tests. Assuming the product tags accurately describe the device, the DRM system operator can issue a product ID for the product and can associate the product tags with the product ID. Generally, a change in the value of some of the product tags may necessitate a different product ID.

In many embodiments of the invention, some product tags may be constant product tags while other tags are variable product tags. Constant product tags are expected to remain constant and not to change through the life of a product. A product credential reference ID can be generated using some or all of the constant product tags associated with a product, as will be described further below.

Variable product tags may change over the life of the product. Variable tags can be used to track characteristics that may change such as software versions. A product descriptor may be formed using a product ID, variable product tags, and constant product tags, as will be described further below.

A list of product tags, in accordance with an embodiment of the invention is shown in FIG. 2A. A set of product tag data, including three variable product tags and seven constant product tags, is illustrated in FIG. 2B. There can be other values of product tags that represent the characteristics of the class of device.

Product ID Version (PT1) indicates the version of the product ID creation algorithm used to generate the product ID and product credential reference ID from the product tags. Each version can also specify lengths and format of tag data, as well as the number of tags and the meaning of each tag. In essence, PT1 allows for the product descriptor to be extensible through the definition of new tag names and versions.

The Brand tag (PT2) is the brand that the device is sold under—the name marked on the product and product packaging.

The ODM/Manufacturer tag (PT3) is the company name of the manufacturer of the product. The company may or may not be the same as the Brand. For instance, a product may be designed and manufactured by an original design manufacturer (ODM) and eventually branded by another firm for sale. Or, a company may design and manufacture its own product, in which case the Brand may be the same as the ODM/Manufacturer.

The Device Type tag (PT4) represents the type of product (e.g., DVD player, television). In many embodiments of the invention, the product type is indicated in a license agreement between the company seeking certification and the certifying DRM system owner.

The Model Number tag (PT5) is the model number of the product indicated on the product and product packaging. In some embodiments of the invention, products with different model numbers may have the same product ID so long as they share the same base model number. These may be thought of as related products which often share the same chipset and/or other major components and differ only by some playback features or capabilities. In other embodiments, each product with a distinct model number has a distinct product ID.

The Base Model Number tag (PT6) is the model number of a product's base model. For a base model itself, the value is the same as the Model Number. In many embodiments of the invention, a base model specifies devices using the same chipset and firmware.

The Silicon Platform ID tag (PT7) is the model number of the chipset or processor architecture used in the device.

The Certified Playback Profile tag (PT8) denotes the playback profile or profiles for which the device is certified. A playback profile is defined by a DRM system owner as a set of supported or compatible file types, container formats, playback codecs, resolutions, and/or other features of digital media content.

The Country tag (PT9) is the country name where the product will be shipped and sold.

The Digital Secure Adaptive Streaming (DSAS) Software Version tag (PT10) can be used to indicate the version numbers for secure adaptive streaming software components implemented on the device. These may include platform components such as the playback software, operating system, and firmware. As will be discussed further below, the tag may be used to determine various device capabilities when the device plays back content such as in the process described in the discussion of FIG. 7 below.

Although specific tags and fields have been described above, systems and methods in accordance with embodiments of the invention can utilize any of a variety of types of information in product tags that are associated with a product ID.

In several embodiments of the invention, product tag values can be obtained from a device by running an application on the device that will record the values and communicate the values to a server. In addition, the product tags can vary with different types and classes of product. In many embodiments, the constant tags or a subset of the constant tags for a specific device are utilized as device match data for the purpose of registering the device within a DRM system in the manner outlined in U.S. patent application Ser. No. 13/339,315, to Chan et al. entitled "Binding of Cryptographic Content Using Unique Device Characteristics with Server Heuristics" filed Dec. 28, 2011, the disclosure of which is incorporated by reference herein in its entirety. As can readily be appreciated, the constant tags can vary from product descriptor to product descriptor and so the constant tags that are utilized as device match data can also vary from one product descriptor to the next.

Product Descriptor

In several embodiments of the invention, a product ID identifies devices of a particular product or product line. In further embodiments, a product descriptor can differentiate devices within a product or product line by feature set or software or firmware versions. A product descriptor includes a product ID and product tag data. In many embodiments, product tag data includes constant product tags and variable product tags. The variable product tags in the product descriptor of one device may have different values from the variable product tags in the product descriptor of another device, while having the same product ID. The actual tags used in the product descriptor can vary between product IDs. The relationship between a product descriptor, product ID, variable product tags, constant product tags, and credential reference identifier (product credential reference ID) in accordance with an embodiment of the invention is conceptually illustrated in FIG. 2C.

Generating a Product Credential Reference Identifier

In several embodiments of the invention, a product credential reference ID is generated using one or more of the product tags and associated with that set of product tags, a product ID, and/or a product descriptor. The product credential reference ID is a unique string of set length generated from some or all of the product tags. In many embodiments of the invention, the product tags used to generate the product credential reference ID are constant product tags. The product credential reference ID is an efficient technique for representing a set of product tags and for detecting tampering. When product tags are changed so that a device passes inspection, the changes can be detected by comparing the product credential reference ID generated using the modified tags and the original product credential reference ID associated with the product ID. The generation of a product credential reference ID can be achieved by many methods, one of which is a cryptographic hash function.

A cryptographic hash function is a procedure or algorithm that takes an arbitrary block of data and returns a fixed-size bit string, the hash value, such that an accidental or intentional change to the data will change the hash value. A cryptographic hash function ideally has four significant properties: it is easy to compute the hash value for a given input value, it is infeasible to generate an input value that has a given hash value, it is infeasible to modify an input value without changing the resulting hash value, and it is infeasible to find two input values with the same hash value.

In many embodiments of the invention, the product credential reference ID generation algorithm uses some or all of the product tags and optionally the product ID as inputs. The result is truncated to a prespecified length, which makes reading and recording by a human observer easier.

In several embodiments, the hash creation and truncation methods are updatable based on the product ID version. It is understood that a very small chance for collision in the credential reference ID exists; however, hash creation and truncation methods can be adapted to mitigate the problem. Although specific techniques are referenced above for generating credential reference IDs, any of a variety of processes appropriate to a specific application can be utilized in accordance with embodiments of the invention.

Product Key

A product key is cryptographic data that can be utilized in the encryption and/or decryption of content and is associated with a product ID and/or product descriptor. In many embodiments, a product key is stored together with the product ID on a CE playback device. As will be discussed further below, the product key can be used in conjunction with one or more other encryption keys stored on the device to access encrypted data (e.g., other keys used to access content or the content itself).

Storage of Product Identifier

Figure 3:
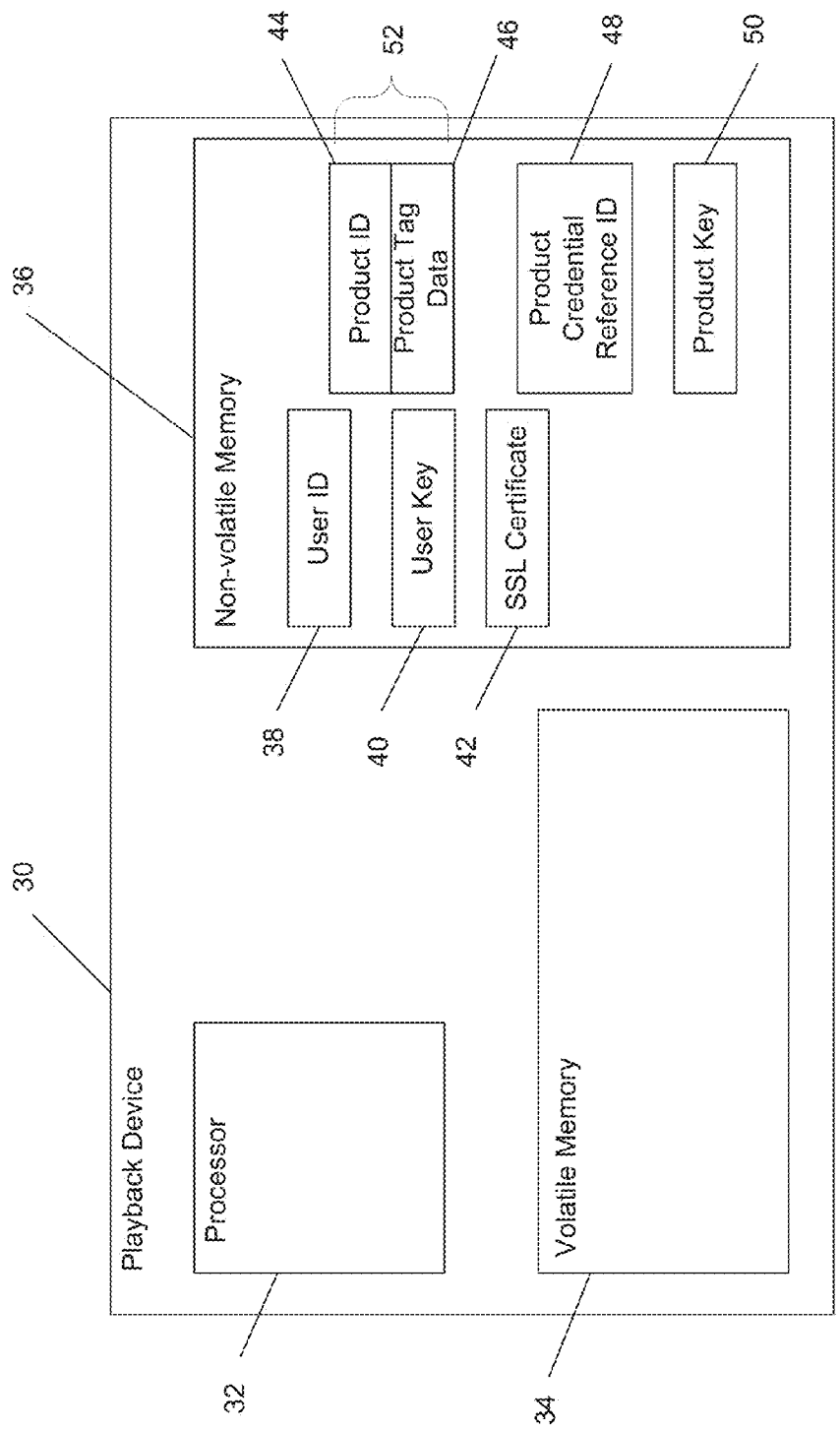
FIG. 3 conceptually illustrates a playback device, which stores information related to a user account and a product identifier and cryptographic data used to decode content in accordance with an embodiment of the invention.

In many embodiments of the invention, a product ID and associated data are stored on a playback device to enable the playback device to identify itself to a DRM system. A playback device, which stores a product ID, product credential reference ID, product tag data (the set of product tags), and product key in non-volatile memory, in accordance with an embodiment of the invention is shown in FIG. 3. The playback device 30 includes a processor 32, volatile memory 34, and non-volatile memory 36. In the illustrated embodiment, the non-volatile memory 36 includes a product ID 44, product tag data 46, a product credential reference ID 48, and a product key 50. As described above, in many embodiments, product ID 44 and product tag data 46 (e.g., constant tags and variable tags) form a product descriptor 52. As will be discussed below, the user ID, user key, and SSL certificate may be stored during a registration process, and the product ID, product credential reference ID, product tag data, and product key are typically loaded onto the device during manufacturing as part of the device's firmware.

Cryptographic data, which can be used to decrypt encrypted data or create secure connections to other systems, may also be stored in the non-volatile memory. In many embodiments, the cryptographic data includes (but is not limited to) a user ID 38 that is a unique identifier for a user account, a user key 40 used in decryption of content, and an SSL certificate 42 used in creating secure connections with other devices via Hypertext Transfer Protocol Secure (HTTPS) or a similar secure communication protocol. HTTPS is a combination of the Hypertext Transfer Protocol (HTTP) with Secure Sockets Layer/Transport Layer Security (SSL/TLS) protocol to provide encrypted communication and secure identification of a network device. In other embodiments, any of a variety of identifiers, keys, certificates and other types of information can be stored as cryptographic data on a playback device.

Figure 4:
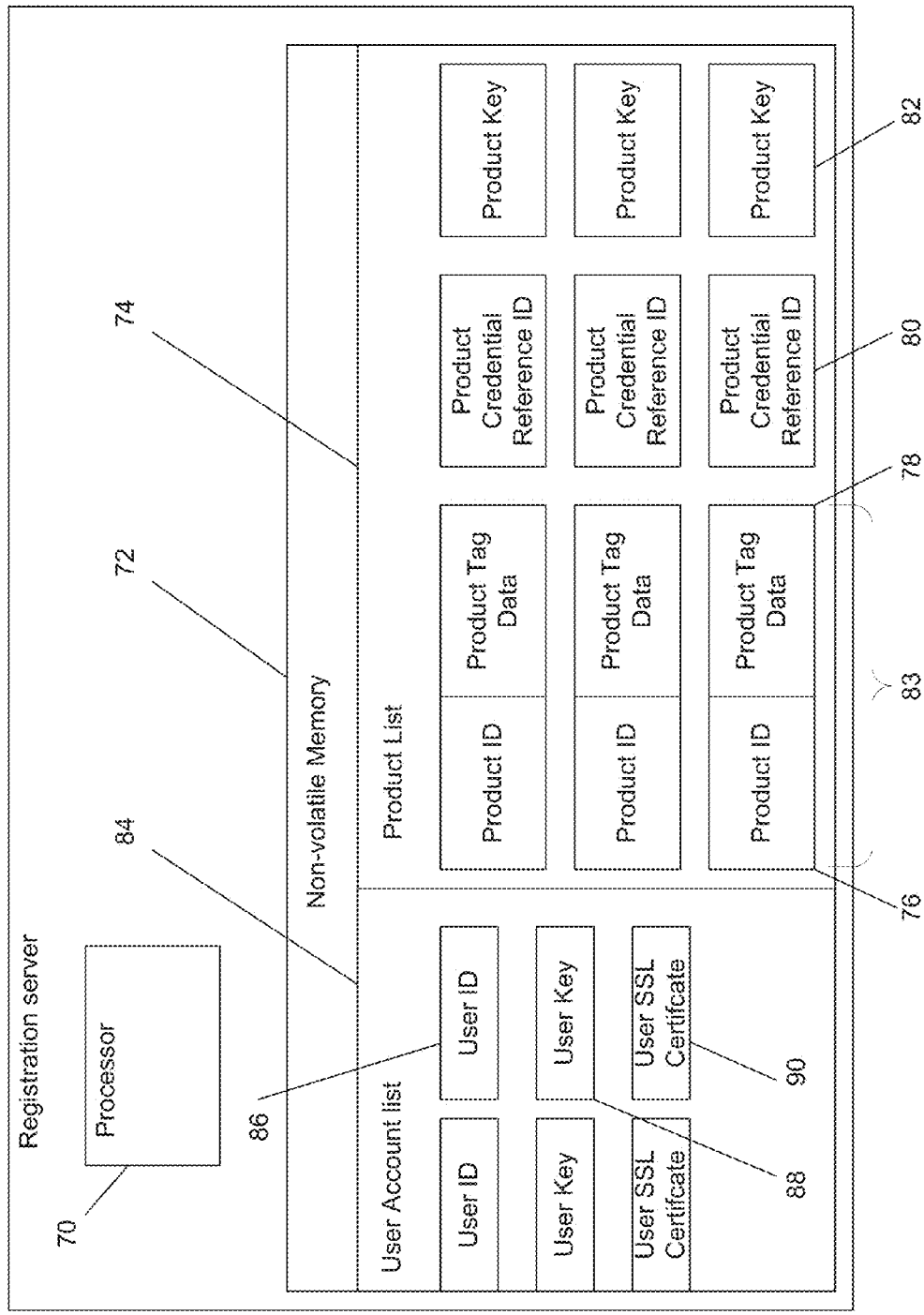
FIG. 4 conceptually illustrates a registration server, which stores information related to user accounts including (but not limited to) cryptographic data, in accordance with an embodiment of the invention.

In several embodiments of the invention, product IDs and data associated with each ID are stored on a registration server. A registration server, which stores the product IDs, product credential reference IDs, sets of product tag data, and product keys in non-volatile memory, in accordance with an embodiment of the invention is shown in FIG. 4. The registration server includes a processor 70 and non-volatile memory 72. The non-volatile memory includes a product list 74, which includes at least one product ID 76, and its associated product tag data 78 (i.e., set of tags), product credential reference ID 80, and product key 82. In many embodiments, a product ID together with product tag data forms a product descriptor 83.

In some embodiments of the invention, the non-volatile memory also includes a user account list 84, which includes at least one user ID 86, and its associated user key 88 and a product SSL certificate 90. The data may also be stored in data structures other than lists, such as (but not limited to) databases. As can readily be appreciated, SSL certificates may be assigned uniquely to user accounts, to product classes, to device models, to individual devices or by numerous other classifications subject to the limitations and security policies of the DRM system.

Issuing a Product Identifier in a Certification Process

Figure 5:
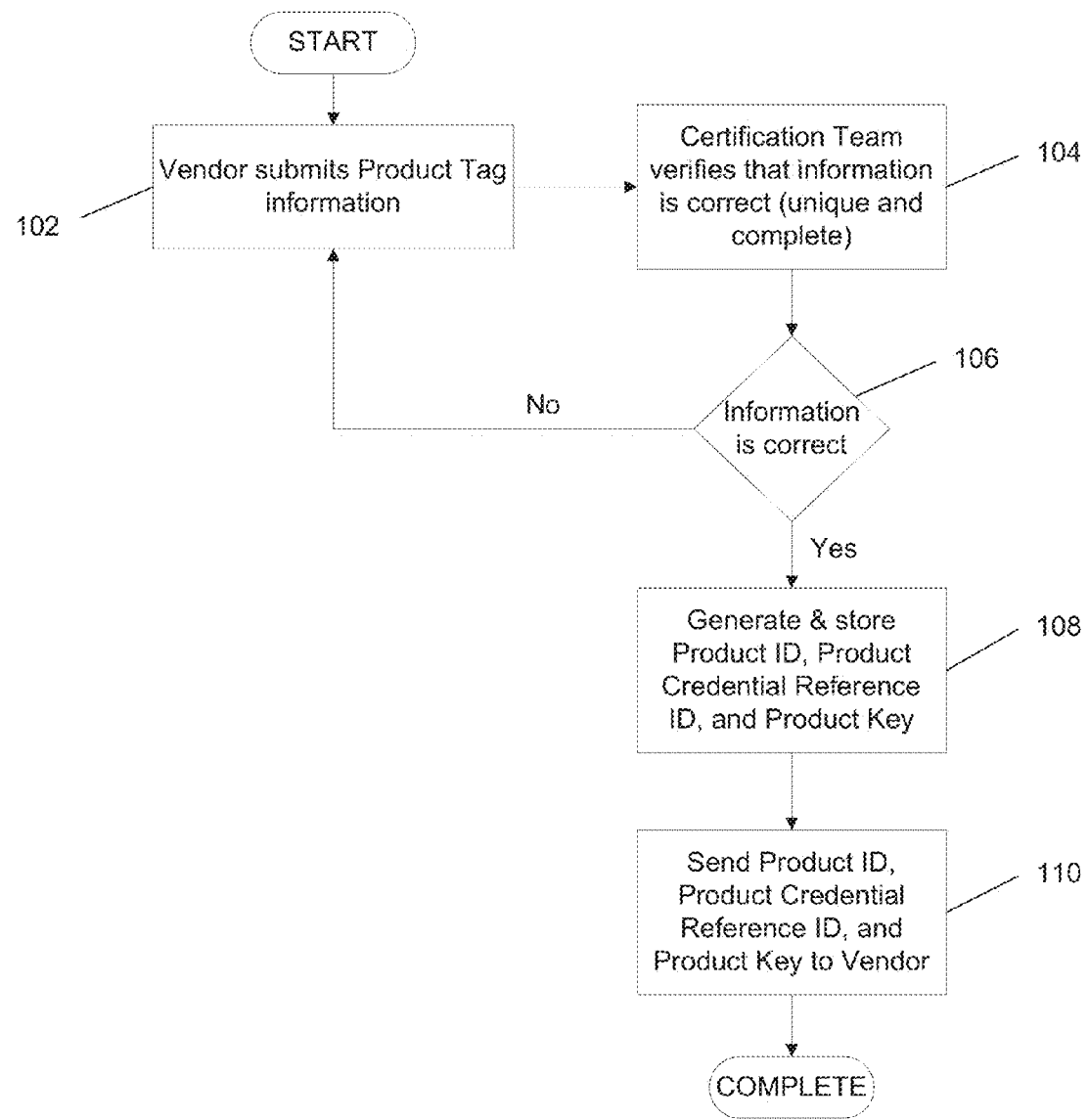
FIG. 5 is a flow chart illustrating a process that can be used to generate a product identifier and associate the product identifier with product tag data in accordance with an embodiment of the invention.

In many embodiments of the invention, a product ID is issued for a set of product tag data and the collection of product ID and the product tag data embedded in each device in the product line associated with that product tag data. A flow chart illustrating a process for issuing a product ID during a certification process, in accordance with an embodiment of the invention is shown in FIG. 5.

A vendor submits (102) product tag data to a certification team. The submission can be a paper form that is filled out with the relevant product tag data, an electronic form that transmits the information over a network, or other manual or automated process. The certification team verifies (104) that the information is correct—that it is unique (i.e., tags that should be unique to a product do not have the same values as tags in another product) and complete (i.e., tags are not missing). If the information is correct (106), the certification team generates (108) a product ID, product credential reference ID, and product key. The newly created product ID, product credential reference ID, and product key are associated with the product tag data and stored on a registration server. The product ID, product credential reference ID, product key, and the product ID version used to generate the product ID are sent (110) to the vendor to be stored on each device in the product line designated by the product ID. In many embodiments, a product descriptor is sent to the vendor that includes the product ID and product tag data.

In several embodiments of the invention, the DRM system owner packages into a dataload the encryption keys, algorithms, and/or other information and software instructions necessary for the device to communicate with DRM servers and receive content. The dataload is given to the manufacturer to be stored as firmware or as data in non-volatile memory on each device when it is manufactured. The product ID and associated data can be included in the dataload given to a manufacturer. The process described above with respect to FIG. 5, however, may be conducted differently in circumstances where a product ID is assigned to a class of devices (e.g. devices that utilize the same operating system) that include different hardware. In situations where a single product ID is assigned to a class of devices (e.g. mobile devices running a specific operating system), the tag values can be dynamically collected from the system and provided to the DRM system during the certification time using a specific certification application. Accordingly, any of a variety of processes for generating product identifying information and loading the information onto devices can be utilized in accordance with embodiments of the invention.

Verifying the Product Identifier

Figure 6:
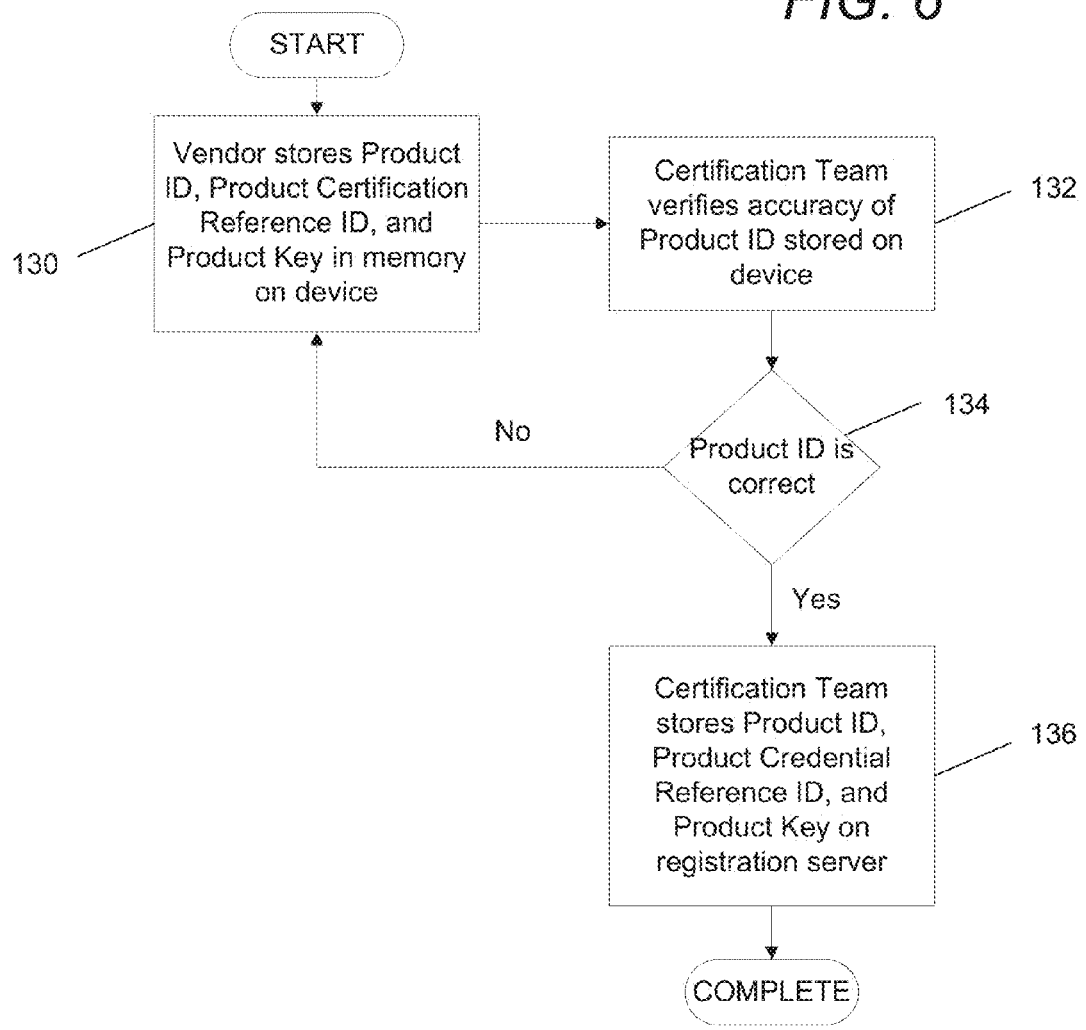
FIG. 6 is a flow chart illustrating a process for verifying the correct storage of a product identifier and associated information on a playback device.

In many embodiments of the invention, certification of a product includes verifying that the product ID and associated tag data within the product descriptor are stored accurately on a device in the product line. A flow chart illustrating a process for verifying a product ID during a certification process, in accordance with an embodiment of the invention is shown in FIG. 6.

The vendor stores (130) a product ID, product certification reference ID, product tag data, and product key in memory on a device. In some embodiments of the invention, the product ID, product certification reference ID, product tag data, and product key can be contained within a dataload of information packaged to be loaded on the device during the manufacturing process as discussed above. In other embodiments, product tag data may be dynamically collected from a device using an application that reads and records tag values as described above, and the device may generate the product credential reference ID.

The certification team verifies (132) that the product ID and other information are stored accurately. A variety of methods can be utilized to complete the verification. An interface on the device may be configured such that the memory can be read directly. Firmware or software on the device may be programmed to respond to a device status call with the product ID, product credential reference identifier, and/or product tag data. Firmware or software on the device may also be programmed to show the information in human-readable format on a display integrated on the device or removably attached to the device. In several embodiments of the invention, the product credential reference identifier and at least one product tag are rendered viewable for certification purposes.

Verification may be facilitated by recalling and displaying the product ID and/or other information stored on the server for comparison with the corresponding information stored on the device. Another mechanism that can be utilized is to transfer the product ID and/or other information stored on the device to a terminal manually (e.g., by human interaction) or electronically (e.g., by a physical or wireless connection). The terminal electronically communicates the information to a registration server storing a copy of the information and the registration server responds with whether the information matches.

If the product ID and other information are correct (134), the certification team stores (136) the product ID, product credential reference ID, product tag data, and product key on the registration server. The information is associated as pertaining to one product line in the DRM system.

If the product ID and other information are not stored correctly, the certification team can investigate whether the product is participating in the DRM system without appropriate authorization. Although a specific process is illustrated in FIG. 6, any of a variety of processes for verifying the product ID and the product related credentials of a device can be utilized in accordance with embodiments of the invention.

Using Product ID and Product Key in Registration and Authentication

In order to participate in a DRM system, a playback device typically connects to a registration server to register itself as an authorized device and connect to a content server each time a user wishes to stream or download content over a network. In several embodiments of the invention, a playback device sends its stored product ID, product credential reference ID, and/or product tag data to a server when registering with a registration server or connecting to a content server to play back streaming content. If the product ID is revoked or if product tag data does not match, the registration or connection attempt can be denied. Various embodiments of the invention utilize a product ID and associated information in authenticating a device to a server in a DRM system. In many embodiments, a product ID and product tag data are sent together as a product descriptor. In several embodiments of the invention, a device receives cryptographic data that it uses to decrypt content and the cryptographic data is encrypted with a product key. Systems and methods for implementing a product ID and product key in registration and authentication of a device are discussed below.

Figure 7:
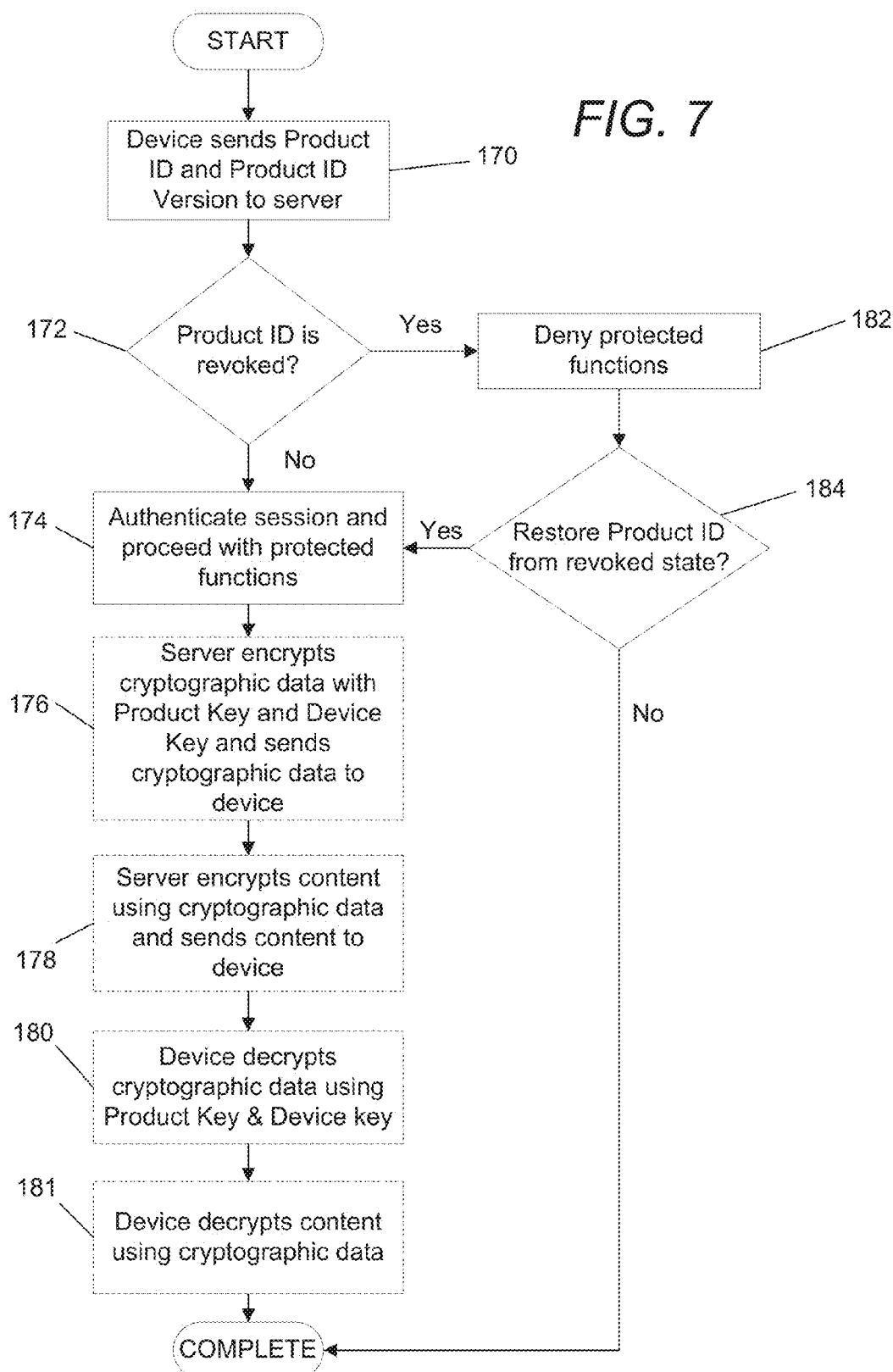
FIG. 7 is a flow chart illustrating a process for checking revocation status of a product identifier and communicating secure data from a server to a device based upon the product identifier.

In many embodiments of the invention, registration of a product includes verifying that the product ID and associated data in the product descriptor are correct and that the product ID has not been revoked. A flow chart illustrating a registration process involving verification of a device's product ID, in accordance with an embodiment of the invention is shown in FIG. 7.

A device sends (170) its stored product ID and product ID version to a server. The server determines (172) if the product ID is in a revoked state. The server may maintain a list of revoked product IDs, may indicate revocation status in a database where the product ID is stored, or obtain revocation status of product IDs with any of a variety of other methods including (but not limited to) communicating with a remote system that maintains product ID revocation status. Revocation status may be determined based upon a product ID, any combination of one or more product tags, or any combination of product ID and product tags. Revocation can be checked by any process where a server receives a combination of product ID and product tags that determines revocation status, or information that can be used to look up the product ID and product tags. The server or the remote system can be configured to update the list or database using various manipulative functions including adding and removing product IDs. If the product ID is revoked, the device will not be permitted any protected functions (182) with the server, unless the product ID is restored (184). A protected function is any function that is restricted to devices that can be authenticated and can include (but are not limited to) registration of the device or issuance of content to the device.

If the product ID is not revoked, the server proceeds to authenticate (174) the session with the device. Authentication may entail the device using its SSL certificate to request a secure connection, although other methods may be used to ensure a secure connection (i.e., where the server and device have reliably identified the machine it is communicating with). For example, during initial registration of a device, the device may not have received an SSL certificate, so a trust relationship may be established by supplying user account details of the customer attempting to register the device.

A variety of protected functions can be allowed once the server has determined that the product ID has not been revoked. Functions may vary depending on the purpose for which the device is communicating to the server. In some embodiments of the invention, a device connects to a registration server for registration on the DRM system. Typically, such a transaction associates the device with a user account and the device receives (176) cryptographic data with which the device can decrypt content. The cryptographic data may include encryption keys associated with the user account such as user keys and other user account data associated with the user account such as (but not limited to) user IDs and product SSL certificates. The cryptographic data may further be encrypted with a product key that is associated with the product ID issued to the device and a device key that is associated with the class of device to which it belongs (e.g., DVD players, televisions).

In many embodiments of the invention, a device connects to a content server to request and receive digital content. The server encrypts (178) the content using cryptographic data that can include encryption keys associated with the user account such as user keys. The server sends the encrypted content to the device. The device may then store or immediately play back the received content, using its stored cryptographic data to access the content. In some embodiments of the invention, the device has user keys stored in memory that are encrypted with a product key and device key. The device key and the product key are used to decrypt (180) a user key and the user key is used to decrypt (181) the encrypted content. In other embodiments, any of a variety of combinations of keys and/or cryptographic data including a product key can be utilized to access encrypted content.

As discussed above, certain variable product tags, such as a Digital Secure Adaptive Streaming (DSAS) Software Version tag (PT10), can be used to indicate the version numbers for secure adaptive streaming software components implemented on the device. Platform components may include the playback software, operating system, and firmware. The collection of the Product ID and the product tags may indicate various device capabilities, such as the category of asset the device can play back. For example, categories of assets may be specified by quality, performance, or resource utilization characteristics that can include (but are not limited to) a bitrate, video resolution, file size, video format, or audio format. Some categories may be lower quality and/or less resource intensive than others. The playback software version or other version number may be associated with certain categories. Thus, a device may initially be manufactured with a software version that is capable of playing back certain categories of assets and later updated or upgraded to play back other categories of assets. A server may determine the playback capabilities based on a combination of the product ID, the constant, and the variable product descriptor tags. Alternatively, if no description for the capability using this combination is found, the server may match on the product ID and the constant product descriptor tag values. Again, if no description for the device capability using this combination is found, the server may perform a match only on the product ID field of the product descriptor and determine a gross set of capabilities that would be tied to the granularity of the products that the product ID is associated with. The identified capabilities can be used for a variety of purposes. In the context of an adaptive bitrate streaming system, the identified capabilities can be utilized to select streams appropriate to the specific device from a set of available streams for inclusion in a dynamically generated top level index file that is then provided to the playback device for use during adaptive bitrate streaming. In other applications, knowledge of device capabilities can be used in any of a variety of different ways appropriate to the specific application.

Although a specific process is illustrated in FIG. 7, any of a variety of processes can be utilized to verify the product ID of a device during registration and/or content distribution in accordance with embodiments of the invention. In several embodiments of the invention, a server can verify the product tag data stored on a device by comparing a generated product credential reference ID against a stored copy. A device sends its stored product tag data and product credential reference ID to the server. The server generates a product credential reference ID in accordance with the corresponding product ID version from the received product tag data. The server then compares the newly generated product credential reference ID with the product credential reference ID stored on the server for that set of product tag data and/or the product credential reference ID received from the device.

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A registration server, comprising:
   a processor;
   memory configured to store:
      a product identifier, where the product identifier is associated with a specific product, is associated with a product credential reference identifier, and is associated with cryptographic information; and
      user account data, where the user account data is associated with a user account;
   wherein the processor is configured by an application to:
      receive a request for registration from a playback device;
      receive the product credential reference identifier associated with the product identifier from the playback device, where the playback device is exemplary of the product associated with the product identifier;
      compare the received product credential reference identifier to a generated copy of the product credential reference identifier stored in the memory;
      retrieve cryptographic information associated with the product identifier when the received product credential reference identifier matches the generated copy; and
      send user account data to the playback device encrypted using at least the cryptographic information associated with the product identifier when the received product credential reference identifier matches the generated copy.

2. The registration server of claim 1, wherein the user account data includes a user identifier and cryptographic information associated with the user identifier.

3. The registration server of claim 2, wherein the cryptographic information associated with the user identifier includes a user key and product SSL certificate.

4. The registration server of claim 2, wherein the processor is further configured by an application to encrypt content using cryptographic information including the cryptographic information associated with the user identifier.

5. The registration server of claim 3, wherein the processor is further configured by an application to authenticate a session with the playback device using at least the product SSL certificate.

6. The registration server of claim 1, wherein the cryptographic information associated with the product identifier includes a product key.

7. The registration server of claim 1, wherein the cryptographic information associated with a user identifier is encrypted using a product key.

8. The registration server of claim 1, wherein the cryptographic information associated with a user identifier is encrypted using a product key and a device key that is associated with the class of device to which the playback device belongs.

9. The registration server of claim 1, wherein the processor is further configured by an application to determine the revocation status of the product identifier.

10. The registration server of claim 9, wherein the memory is further configured to store a revocation list of revoked product identifiers.

11. The registration server of claim 10, wherein the processor is further configured by an application to maintain and update the revocation list by adding or removing revoked product identifiers.

12. The registration server of claim 9, wherein the processor is further configured by an application to communicate with a remote system that maintains product identifier revocation status.

13. The registration server of claim 1, wherein the memory is further configured to store product tag data associated with the product identifier, and wherein product tag data comprises at least one product tag that describes a characteristic of the product.

14. The registration server of claim 13, wherein product tag data comprises at least one tag selected from the group consisting of: product ID version, brand, ODM/manufacturer, device type, model number, base model number, silicon platform ID, certified playback profile, country, and digital secure adaptive streaming software version.

15. The registration server of claim 13, wherein the memory is further configured to store a product credential reference identifier that is associated with the product identifier and is uniquely generated using at least a portion of the product tag data.

16. The registration server of claim 15, wherein the method used to generate the product credential reference identifier corresponds to a product identifier version.

17. The registration server of claim 13, wherein the processor is further configured by an application to:
   send a request for product tags to a playback device;
   receive at least one product tag from the playback device;
   generate a first product credential reference identifier from at least one of the received product tags; and
   determine whether the first product credential reference identifier matches a second product credential reference identifier.

18. The registration server of claim 17, wherein the processor is further configured by an application to retrieve the second product credential reference identifier from the memory.

19. The registration server of claim 17, wherein the processor is further configured by an application to receive the second product credential reference identifier from the playback device.

20. A method of identifying a playback device with a product identifier using a registration server, the method comprising:
receiving a request for registration from a playback device;
receiving a product credential reference identifier associated with a product identifier from a playback device, where the product identifier is associated with a specific product and is associated with cryptographic information, and where the playback device is exemplary of the product associated with the product identifier;
comparing the received product credential reference identifier to a generated copy of the product credential reference identifier stored in memory;
retrieving cryptographic information from memory that is associated with the received product identifier when the received product credential reference identifier matches the generated copy; and
sending user account data to the playback device encrypted using at least the cryptographic information associated with the product identifier when the received product credential reference identifier matches the generated copy, where the user account data is associated with a user account.

21. The method of claim 20, wherein the user account data includes a user identifier and cryptographic information associated with the user identifier.

22. The method of claim 21, wherein the cryptographic information associated with the user identifier includes a user key.

23. The method of claim 20, wherein the cryptographic information associated with the product identifier includes a product key.

24. The method of claim 21, wherein the cryptographic information associated with a user identifier is encrypted using a product key.

25. The method of claim 21, wherein the cryptographic information associated with a user identifier is encrypted using a product key and a device key that is associated with the class of device to which the playback device belongs.

26. The method of claim 20, further comprising determining the revocation status of the product identifier.

27. The method of claim 26, further comprising communicating with a remote system that maintains product identifier revocation status.

28. The method of claim 20, further comprising associating product tag data with the product identifier, where the product tag data comprises at least one product tag that describes a characteristic of the product, and storing the product tag data in memory.

29. The method of claim 28, wherein product tag data comprises at least one tag selected from the group consisting of: product ID version, brand, ODM/manufacturer, device type, model number, base model number, silicon platform ID, certified playback profile, country, and digital secure adaptive streaming software version.

30. The method of claim 28, further comprising associating a product credential reference identifier that is uniquely generated using at least the product identifier and at least a portion of the product tag data, and storing the product credential reference identifier in memory.

31. The method of claim 30, wherein the method used to generate the product credential reference identifier corresponds to a product identifier version.

32. The method of claim 28, further comprising:
sending a request for product tags from a playback device;
receiving at least one product tag from the playback device;
generating a first product credential reference identifier from at least one of the received product tags; and
determining whether the first product credential reference identifier matches a second product credential reference identifier.

33. The method of claim 32, further comprising receiving the second product credential reference identifier from the playback device.

34. The method of claim 32, further comprising retrieving the second product credential reference identifier from memory.

35. A non-transitory machine readable medium containing processor instructions, where execution of the instructions by a processor causes the process to perform a process comprising:
receiving a request for registration from a playback device;
receiving a product credential reference identifier associated with a product identifier from a playback device, where the product identifier is associated with a specific product and is associated with cryptographic information, and where the playback device is exemplary of the product associated with the product identifier;
comparing the received product credential reference identifier to a generated copy of the product credential reference identifier stored in memory;
retrieving cryptographic information from memory that is associated with the received product identifier when the received product credential reference identifier matches the generated copy;
encrypting user account data using at least the cryptographic information associated with the product identifier when the received product credential reference identifier matches the generated copy;
sending the encrypted user account data to the playback device when the received product credential reference identifier matches the generated copy.

* * * * *